United States Patent
Espinoza-Ibarra et al.

(10) Patent No.: US 7,424,624 B2
(45) Date of Patent: Sep. 9, 2008

(54) RACK EQUIPMENT POWER PURCHASE PLAN SUPERVISION SYSTEM AND METHOD

(75) Inventors: Ricardo Espinoza-Ibarra, Lincoln, CA (US); Kirk Michael Bresniker, Roseville, CA (US); Andrew Harvey Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 792 days.

(21) Appl. No.: 10/741,906

(22) Filed: Dec. 18, 2003

(65) Prior Publication Data

US 2005/0137894 A1    Jun. 23, 2005

(51) Int. Cl.
    G06F 1/00    (2006.01)
    G06F 1/26    (2006.01)
    G06F 1/32    (2006.01)
    G06F 11/30   (2006.01)

(52) U.S. Cl. .................. 713/300; 713/320; 713/321; 713/323; 713/330; 713/340

(58) Field of Classification Search ................. 713/300
    See application file for complete search history.

(56) References Cited

U.S. PATENT DOCUMENTS

| | | | |
|---|---|---|---|
| 6,301,527 B1 * | 10/2001 | Butland et al. ............ 700/286 |
| 6,775,784 B1 * | 8/2004 | Park ........................... 713/320 |
| 6,785,592 B1 * | 8/2004 | Smith et al. ................. 700/291 |
| 6,836,849 B2 * | 12/2004 | Brock et al. ................ 713/310 |
| 6,859,882 B2 * | 2/2005 | Fung .......................... 713/300 |
| 6,952,782 B2 * | 10/2005 | Staiger ...................... 713/300 |
| 7,028,195 B2 * | 4/2006 | Kasprzak et al. ........... 713/300 |
| 7,051,215 B2 * | 5/2006 | Zimmer et al. ............. 713/300 |
| 2001/0003206 A1 * | 6/2001 | Pole et al. ................... 713/320 |
| 2002/0046155 A1 * | 4/2002 | Mashinsky et al. ........... 705/37 |
| 2003/0189420 A1 * | 10/2003 | Hashimoto et al. .......... 323/212 |
| 2004/0025064 A1 * | 2/2004 | Felsman ..................... 713/300 |
| 2004/0025071 A1 * | 2/2004 | Vicard ....................... 713/340 |

* cited by examiner

Primary Examiner—Rehana Perveen
Assistant Examiner—Michael J Brown

(57) ABSTRACT

A rack equipment power purchase plan supervision system and method is presented. In one embodiment of the present invention, a rack equipment power purchase plan supervision system includes rack equipment for processing information. The rack equipment is supervised by a rack equipment power purchase plan supervision component in accordance with a power purchase plan. The power purchase plan defines operational settings of the rack equipment for various power supply conditions. A communication bus for communicating information communicatively couples the power purchase plan supervision component and the rack equipment.

20 Claims, 4 Drawing Sheets

RACK EQUIPMENT POWER PURCHASE PLAN SUPERVISION SYSTEM AND METHOD

FIELD OF THE INVENTION

The present invention relates to rack equipment management.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, electronic systems designed to provide these advantageous results are realized through the leveraged utilization of centralized resources by distributed network nodes. While leveraged utilization of centralized resources is usually advantageous, power fluctuations and/or shortages at the centralized location can have significant impacts on processing operations and efficient power management is often complex and difficult.

Centralizing certain resources within a distributed network typically provides desirable benefits. Clients interested in engaging a host to provide centralized resources and services typically have a desire to avoid providing the infrastructure, operation and maintenance directly themselves. Managing and maintaining different types of rack equipment and numerous applications in a typical large and complicated centralized networked host resource environment for a variety of different clients raises many challenging operational issues. A typical hosting infrastructure usually involves a variety of support activities that can have a significant impact on the services provided and the cost of the service, such as providing power.

The manner in which centralized resources are operated is very important and power supply fluctuations are usually problematic in conventional preset server management approaches. For example, fixed preset rack equipment operating levels are often assigned upon a perceived generic implementation and often do not adequately address varied client deployment desires. In addition, the dynamic nature and high variability of power availability and economics can have significant detrimental impacts on operations. Power fluctuations can also cause cascading problems within the data center to resources utilized by multiple clients. Traditional approaches to power supply shortages usually involve inflexible default power drops. Limited attempts at manually adjusting the rack equipment usually require the operator to have extensive knowledge and understanding of unique features of each piece of equipment. The complexity and typical dynamic interaction of rack equipment tends to increase the probability of human error in making adjustments. In addition, there is usually very little notice of power fluctuations and manual reaction techniques usually have difficulty accommodating processing activity with urgent timing requirements.

SUMMARY OF THE INVENTION

A rack equipment power purchase plan supervision system and method is presented. In one embodiment of the present invention, a rack equipment power purchase plan supervision system includes rack equipment for processing information. The rack equipment is supervised by a rack equipment power purchase plan supervision component in accordance with a power purchase plan. The power purchase plan defines operational settings of the rack equipment for various power supply conditions. A communication bus for communicating information communicatively couples the power purchase plan supervision component and the rack equipment.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

Figure 1:
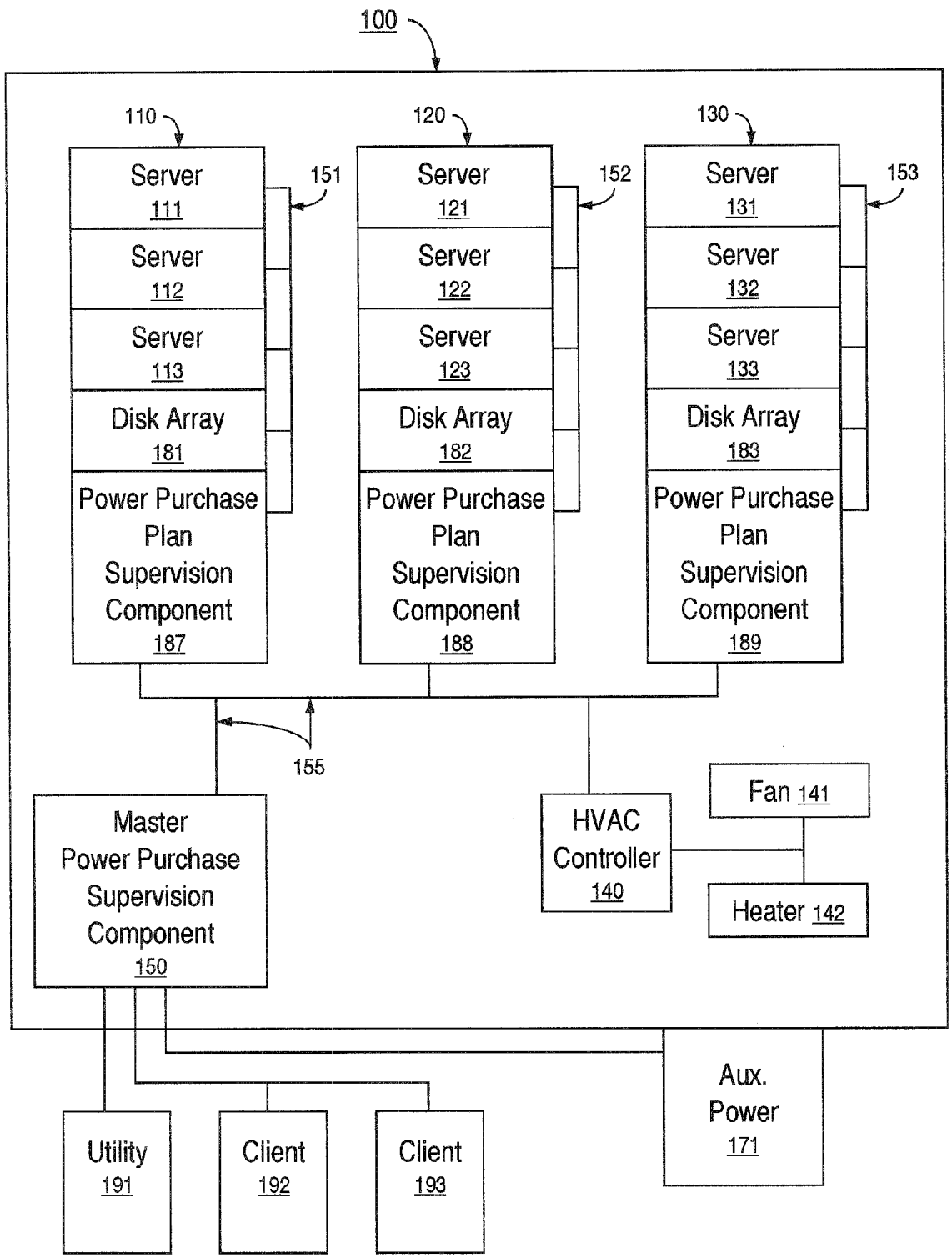
FIG. 1 is an illustration of a power purchase plan rack equipment supervision system in accordance with one embodiment of the present invention.

FIG. 1 is an illustration of power purchase plan rack equipment supervision system 100, in accordance with one embodiment of the present invention. Rack equipment power purchase plan supervision system 100 includes a plurality of racks 110, 120, and 130, master power purchase plan supervision component 150, and heating, venting and air conditioning (HVAC) controller 140. Equipment racks 110, 120 and 130 comprise servers 111 through 133, disk arrays 181, 182 and 183, and power purchase plan supervision components units 187, 188 and 189. Master power purchase plan supervision component 150 is communicatively coupled to equipment racks 110, 120, and 130, and HVAC controller 140 through communication channel 155.

The components of rack equipment power purchase plan supervision system 100 cooperatively operate to process information and change operating conditions to accommodate power supply fluctuations. The plurality of servers 111 through 133 process information. Disk arrays 181, 182 and 183 store information for processing. Power purchase plan supervision components 187, 188 and 189 supervise operational changes to equipment included in equipment racks 110, 120, and 130 based upon a power purchase plan. Master power purchase plan supervision component 150 coordinates the changes "between" racks 110, 120 and 130 and equipment (e.g., HVAC controller 140) that support operations of multiple racks in accordance with the power purchase plan. Master power purchase plan supervision component 150 also receives equipment rack power purchase plan related information from power utility 191 and information processing clients 192 and 193. For example, master power purchase plan supervision component 150 can receive indications of power fluctuations from power utility 191 (e.g., indication of a power fluctuation, rolling blackout, etc.) and changes in power purchase plan options from processing clients 192 and 193 (e.g., change to an alternate power purchase plan).

The communication links included in the rack equipment power purchase plan supervision system 100 communicate information between components of system 100. Communication link 151 communicatively couples power purchase plan supervision component 187 to other equipment (e.g., server 111, 112 and 113 and disk array 181) in rack 110. Communication link 152 communicatively couples power purchase plan supervision component 188 to other equipment in rack 120. Communication link 153 communicatively couples power purchase plan supervision component 189 to other equipment in rack 130. Communication link 155 communicatively couples master power purchase plan control center 150, power purchase plan supervision components 187, 188, and 189, and HVAC controller 140. There are a variety of configurations that are compatible with present invention communication links. A present invention communication link can be established by "injecting" (e.g., modulating) a signal on a power cord (e.g., AC or DC line cord), an RS-485 system, an Ethernet 10/100/100bT local area network (LAN), and/or wireless communications channels.

Power purchase plan supervision components 187, 188, 189 and master power purchase plan supervision component 150 change rack equipment and rack area support equipment operations in accordance with policies and objectives of a power purchase plan. The power purchase plan facilitates imposition of rack equipment operational changes based upon power purchase plan guidelines. For example, the power purchase plan can define operational settings of the rack equipment for various power supply conditions (e.g., rolling blackouts, service interruptions, brown outs, etc.). The power purchase plan supervision components analyze the power purchase plan policy information in conjunction with equipment description information to formulate commands that direct actions on the equipment in racks 110, 120 and 130 and related support equipment. For example, the commands can direct modulation of operation settings and performance levels of the rack equipment. In one embodiment, the power purchase plan supervision components direct changes in operating conditions to maintain rack equipment operation within the power consumption and heat dissipation budget as well as power purchase plan guidelines. The changes can facilitate maximization of tradeoffs between performance and power consumption/thermal dissipation. The rack power purchase plan can be dynamically adjusted on the fly.

With reference still to FIG. 1, there are a variety of ways in which master power purchase plan supervision component 150 and power purchase plan supervision components 187, 188 and 189 change the operation settings of equipment included in rack equipment power purchase plan supervision system 100. For example, power purchase plan supervision components 187, 188 and 189 can direct adjustments in the frequency and operating voltage characteristics of equipment included in racks 110, 120 and 130 respectively. Power purchase plan supervision components 187, 188 and 189 can also instruct equipment included in racks 110 through 130 respectively to turn on or off. Alternatively power purchase plan supervision components 187, 188 and 189 can instruct execution components (e.g., parallel processors, pipelines, etc.) and/or portions of a memory component (e.g., a disk array, etc.) to turn on or off. A power purchase plan supervision component can make the changes in a manner that optimally balances consumption of available power and performance of processing activities. For example, continue to provide power to high priority processing activities while reducing power supplied to lower priority processing activities.

Master power purchase plan supervision component 150 and power purchase plan supervision components 187, 188 and 189 can also direct operational setting changes to various other detection and support components. Auxiliary power unit 171 provides auxiliary power in accordance with directions from master power purchase plan supervision component 150 based upon power purchase plan guidelines. HVAC controller 140 controls the heating, venting and cooling equipment associated with an area in which equipment racks 110, 120 and 130 are located. For example, HVAC controller 140 controls fan 141, heater 142 and an air conditioning unit (not shown) that vent, heat, and cool the area (e.g., a room) in which equipment racks 110, 120 and 130 are located. Master power purchase plan supervision component 150 also directs operational setting changes in fan 141, heater 142 and the air conditioning unit (not shown) via HVAC controller 140.

Power purchase plan supervision components (e.g., 187, 188, 189 and/or 150) can also comprise an interface for facilitating user interaction with rack equipment adjustments based upon power supply conditions. The interface allows operators or other equipment (e.g., remote resources coupled via a network) to manually and/or automatically participate in changes to rack equipment operational settings. The interface is a mechanism for communicating information to and from an operator or user. For example, the interface can enable operator intervention and provides a variety of power supply and performance related information in a cohesive, user friendly presentation.

Figure 2:
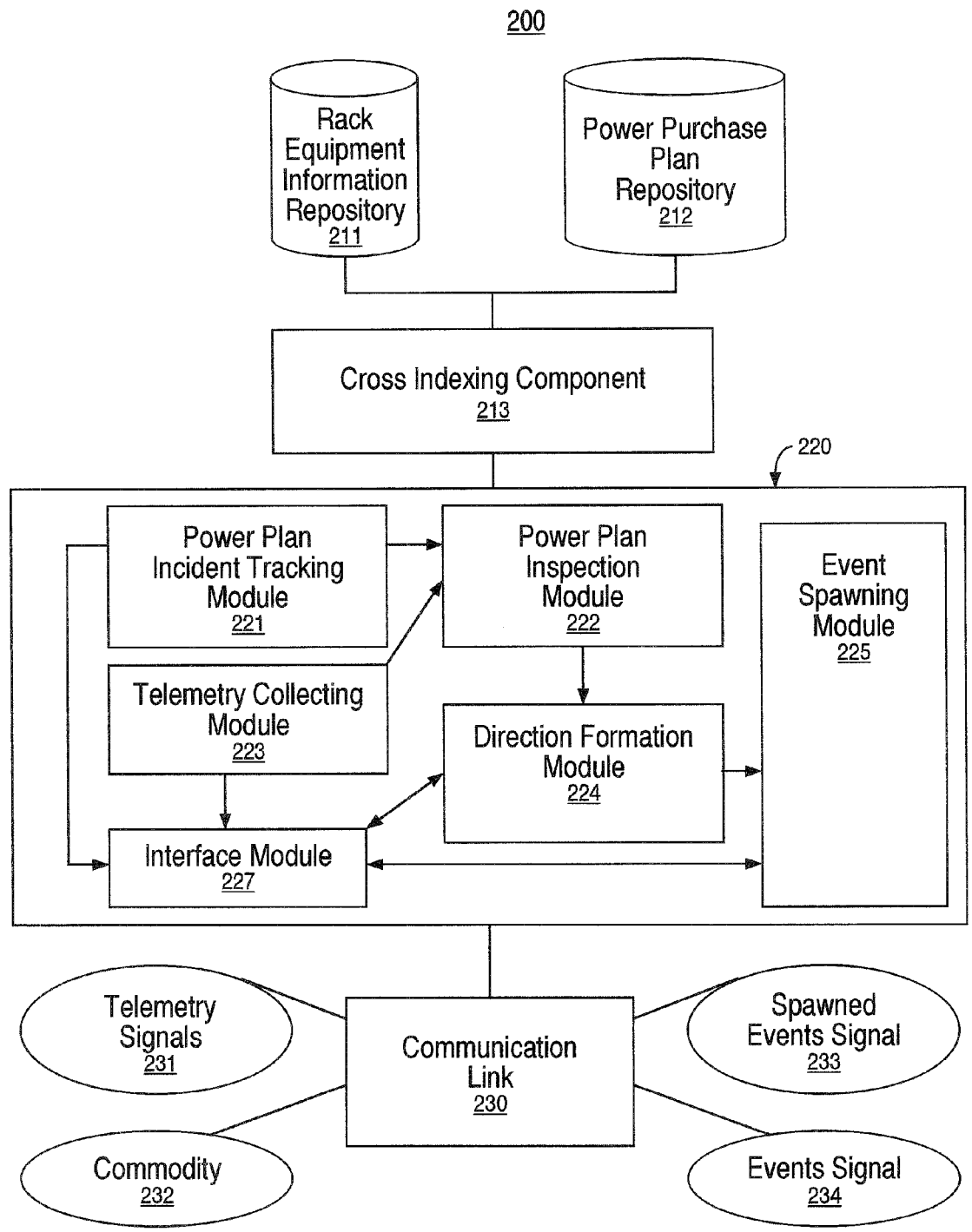
FIG. 2 is an illustration of a power purchase plan supervision component in accordance with one embodiment of the present invention.

FIG. 2 is an illustration of power purchase plan supervision component 200, one embodiment of a present invention power purchase plan supervision component. Power purchase plan supervision component 200 includes rack equipment information repository 211, rack equipment power purchase plan repository 212, cross indexing component 213, power purchase plan processing component 220, and communication link component 230. The components of power purchase plan supervision component 200 cooperatively operate to modulate operational settings of rack equipment based upon power purchase plan policies. Equipment information repository 211 stores information about equipment included in the rack (e.g., rack equipment description information). Rack equipment power purchase plan repository 212 stores information on power purchase plans (e.g., policy guidelines and plan objectives). Cross indexing component 213 correlates equipment information and power purchase plan information. Power purchase plan processing component 220 processes instructions for modulating operational settings associated with power purchase plan guidelines. Power purchase plan supervision component 200 utilizes communication link 230 for external communications. For example, power purchase plan supervision component 200 utilizes communication link 230 to forward and receive telemetry signals 231, commodity signals 232, spawned event signals 233 and trigger event signals 234.

In one embodiment, power purchase plan processing component 220 includes power plan incident tracking module 221, power plan inspection module 222, telemetry collection module 223, direction formation module 224, event spawning module 225 and interface module 227. Power plan incident tracking module 221 tracks power fluctuation incidents designated in a power purchase plan. Power plan inspection module 222 determines power purchase plan policy directions associated with the triggering events. Telemetry collection module 223 collects characteristics and activity information of equipment associated with said power purchase plan. Direction formation module 224 formulates performance modification commands for implementing the power purchase plan directions. Event spawning module 225 generates power purchase plan trigger events. Interface module 227 performs interface operations.

Power purchase plan incident tracking module 221 can track indications of a variety of power fluctuation incidents designated in a power purchase plan. If power plan incident tracking module 221 receives an indication of a power supply change or triggering event, power supply incident tracking module 221 sends an indication of the power supply trigger to power plan inspection module 222 for analysis and processing. For example, power plan incident tracking module 221 can notice indications of power supply changes (e.g., rolling blackouts, brownouts, service interruptions, etc.) and forwards notification of the change to power plan inspection module 222. Power plan incident tracking module 221 can receive the notice from telemetry collection module 223 and can determine if the telemetry information indicates the occurrence of a change in a power supply condition (e.g., related to a policy action and/or management objective).

Power plan inspection module 222 can analyze a variety of different power purchase plan policy objectives in response to a power supply fluctuation indication. The power plan inspection module 222 can determine appropriate actions for implementing the power purchase plan objectives. For example, the power purchase plan policies can be structured in accordance with regulatory requirements and/or the power purchase plan policy can be interactive. The power plan inspection module 222 can determine if the occurrence of a power supply fluctuation (e.g., tracked by power plan incident tracking module 221) indicates a modification to the operating settings of rack equipment (e.g., return to its prior condition and/or a condition indicated in a power purchase plan policy objective). The power plan inspection module 222 can also determine if actions or corrections to operational settings are limited by other policy constraints. For example, power plan inspection module 222 can determine if a power consumption and heat dissipation budget limit power plan objective actions or if any of the policies contradict or limit each other. The power plan inspection module 222 provides an indication of the action (e.g., a temperature change) to direction formation module 224.

Telemetry collection module 223 can be utilized to direct the collection of telemetry information associated with various different power fluctuation conditions. For example, telemetry collection module 223 is readily adaptable for utilization with different power supply interfaces, including different types and brands of power utility interfaces, power generation systems, and other temporary power supply systems (e.g., uninterruptible power supply systems). Telemetry collection module 223 is also readily adaptable for utilization with a variety of different rack equipment. Telemetry collection module 223 can also direct collection or retrieval of information for confirming operational settings and performance adjustment commands are complied with. Telemetry module 223 can also direct retrieval of rack equipment description information (e.g., rack equipment operation settings and performance levels) and support equipment (e.g., HVAC units).

Direction formation module 224 is capable of creating a variety of different instructions in response to notifications received from power plan inspection module 222. Direction formation module 224 can extract instruction protocol and syntax requirements from rack equipment description information (e.g., included in a rack equipment repository). The instructions can direct a change in rack equipment and/or support equipment operating settings. For example, the instructions can direct a change in a temperature setting of HVAC support equipment and/or heat dissipation level for the rack equipment. The instructions can include a command or direction to change the operating frequency, change the voltage of supply power or turn on/off rack equipment and/or support equipment (e.g., fan 141, heater 142, auxiliary power unit 171, etc.). The operation adjustment instructions can be forwarded to rack equipment and associated support equipment. For example, instruction creation module 224 can forward operation adjustment instructions to change the operation settings of the rack equipment.

Event spawning module 225 spawns power purchase plan trigger events. Event spawning module 225 can spawn a power purchase plan triggering event that causes a power purchase plan supervision component to interface with other power purchase plan supervision components. Alternatively, event spawning module 225 can spawn a power purchase plan triggering event directly for rack equipment under the control of other power purchase plan supervision components, clients, and/or external support operations (e.g., a power utility). For example, master power purchase plan supervision component 150 can receive indications of a power supply fluctuation from utility 191 and spawn a triggering event indication to power purchase plan supervision component 187, 188 and/or 189. Conversely, power purchase plan supervision components 187, 188 and 189 can spawn a triggering event requesting more power that causes master power purchase plan supervision component 150 to direct auxiliary power 171 to increase or decrease the power supply in accordance with a predetermined power purchase plan policy.

In one embodiment of the present invention, a power purchase plan supervision component (e.g., 187) is included in an intelligent power distribution unit (IPDU). The IPDU can be utilized to aggregate multiple power line cords from rack equipment into a smaller number of power line cords at a rack level. In one exemplary implementation in which power cords are used as a present invention communication link, the presence of each piece of rack equipment can be detected as the rack equipment is communicatively coupled to the IDPU. In addition, information associated with the piece of rack equipment (e.g., power and thermal performance operating points, information indicating the type of rack equipment, characteristics of the rack equipment, etc.) can be automatically communicated to the IPDU. Even if a piece of rack equipment does not have an available relevant descriptive information store itself, the IPDU can sense current draw and account for unregulated use in equipment rack management policy decisions.

Figure 3:
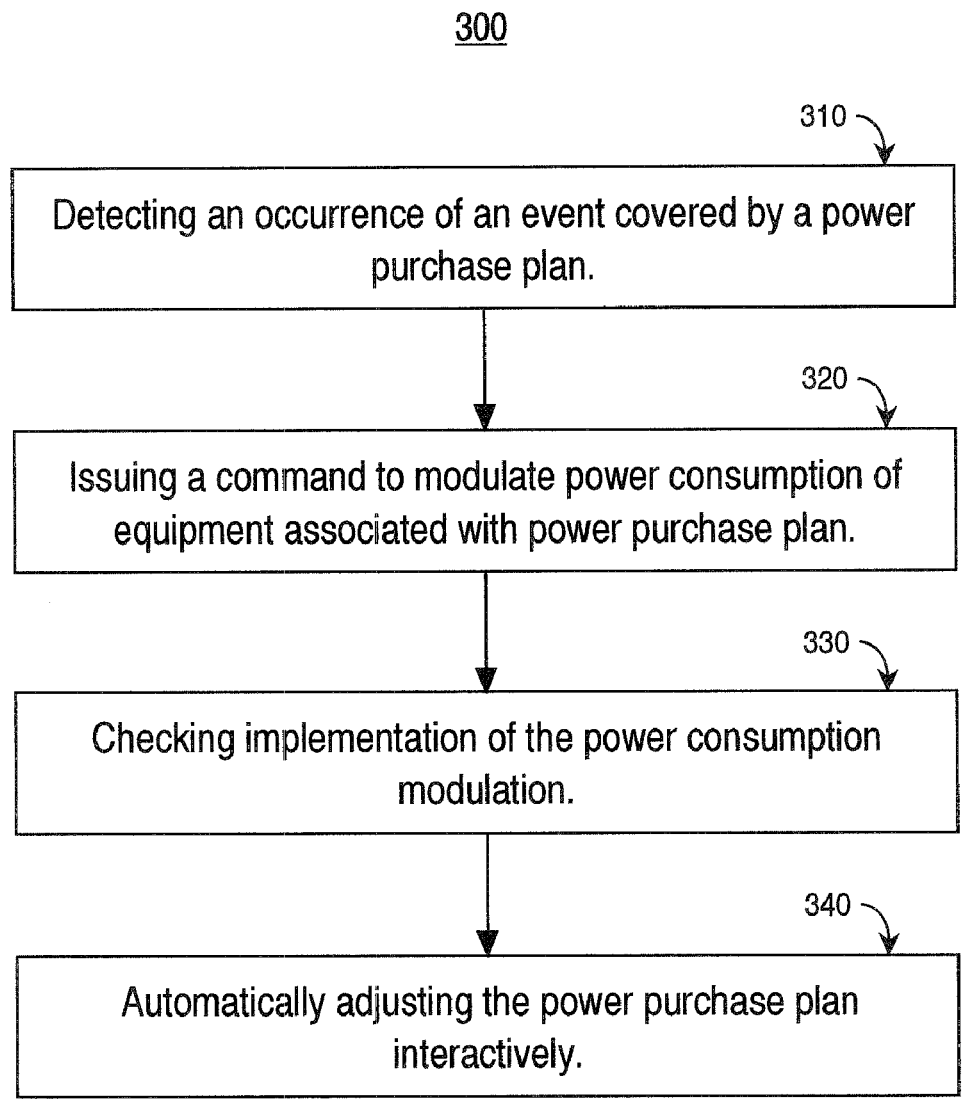
FIG. 3 is a flow chart of a power purchase plan supervision method in accordance with one embodiment of the present invention.

FIG. 3 is a flow chart of power purchase plan supervision method 300, a power purchase plan supervision method in accordance with one embodiment of the present invention. Power purchase plan supervision method 300 establishes a communication and control protocol for automatic modulation of rack equipment operating conditions based upon a power purchase plan. The communication and control protocol also facilitates manipulation of rack equipment operation and performance in accordance with a rack equipment power purchase plan or policies. Power purchase plan supervision method 300 also provides an interface for presenting information in a convenient manner to a user.

In step 310, occurrence of an event covered by a power purchase plan is detected. For example, information indicating an indication of a rack equipment power purchase plan trigger event is detected. For example, the information can include an indication of a fluctuation in the power supply (e.g., rolling blackouts, utility service interruption, etc.). The information received in step 310 can include power availability information and/or fluctuation in power supply (e.g., an indication a power supply voltage level drops below a predetermined threshold level).

A command to modulate power consumption of rack equipment based upon the power purchase plan is issued in step 320. In one embodiment, the modulation is executed by adjusting a frequency and a voltage of the rack equipment. For example, the modulation is executed by turning off rack equipment associated with data processing. The command corresponds to a correlation between the modulation and the power purchase plan. In one implementation, the command corresponds to an operation setting action set forth in a power purchase plan for a particular event detected in step 310. For example, the command can include determining an appropriate adjustment setting for rack equipment (e.g., heat dissipation settings) and/or support equipment (e.g., auxiliary power supply setting) in response to a particular power supply fluctuation. The command can also be tailored to possible actions available for a particular piece of rack equipment. For example, possible operation setting and/or performance level changes. The power purchase plan can be an agreement between a host and a client. The power purchase plan can include guidelines corresponding to agreements for adjusting rack equipment in response to a power supply event. For example rack equipment can be turned off in response to rolling blackouts, or alternatively auxiliary power can be supplied. The power purchase plan can also be implemented to be compatible with local power utility constraints.

At step 330, implementation of the power consumption modulation is checked. For example, equipment performance modulations are checked for compliance with the power purchase plan guidelines. The equipment can include rack equipment and support equipment. The equipment performance modulation is directed to bring operation of the rack equipment within guidelines set forth in a power purchase plan. In one exemplary implementation, performance modulation instructions are forwarded to the rack equipment and the response of the equipment is checked. The modulation of the equipment performance levels can change the power consumption and thermal load of the rack equipment. For example, the modulation of the equipment performance levels can result in an increase or decrease in the heat dissipated by the rack. In another example, the manipulation can include turning on and off the equipment. The directions can also include issuing a command to manipulate operation of support equipment (e.g., HVAC equipment, auxiliary power equipment, etc.).

In step 340, the power purchase plan is automatically adjusted interactively. In one embodiment the power purchase plan is adjusted via a power purchase plan adjustment interface. The interface activities also include presenting information in a convenient and user friendly manner. For example, power purchase plan information, corresponding rack equipment description information and telemetry information (e.g., operating level settings) can be displayed. Similar information associated with rack support equipment (e.g., HVAC equipment, auxiliary power, etc.) can also be presented. The interface activities also include automatically adjusting the power purchase plan interactively.

Figure 4:
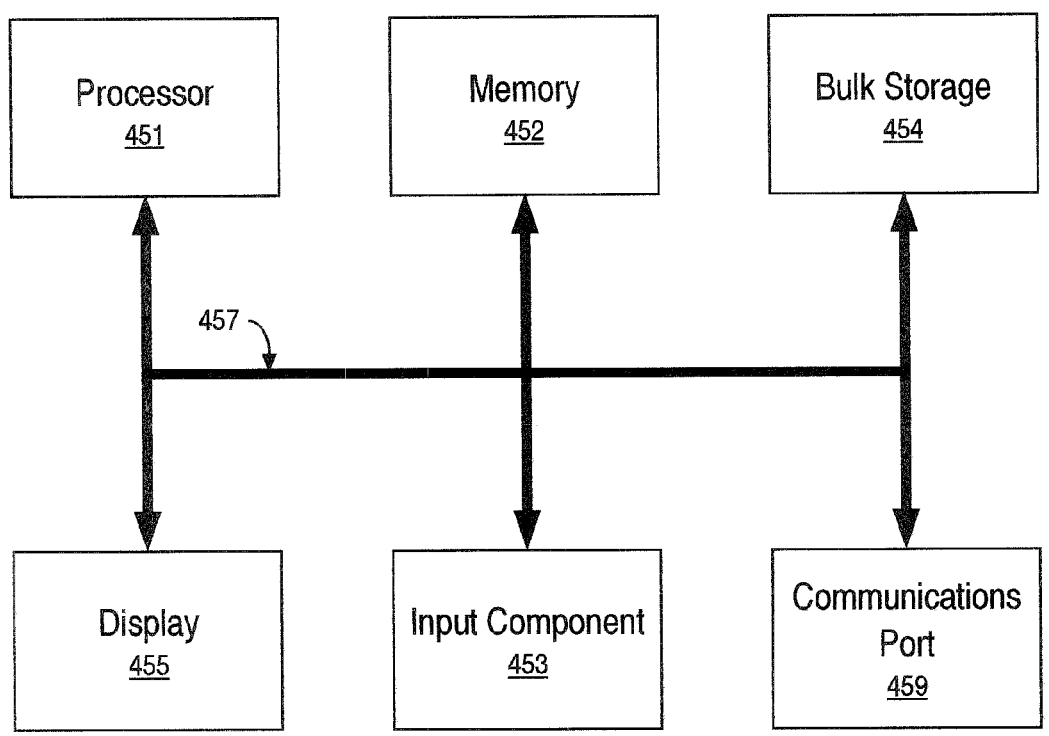
FIG. 4 is a block diagram of one embodiment of a computer system on which the present invention can be implemented.

FIG. 4 is a block diagram of computer system 400, one embodiment of a computer system on which the present invention can be implemented. For example, computer system 400 can be utilized to implement power purchase plan processing component 220 or power purchase plan supervision method 300. Computer system 400 includes communication bus 457, processor 451, memory 452, input component 453, bulk storage component 454 (e.g., a disk drive), network communication port 459 and display module 455. Communication bus 457 is coupled to central processor 451, memory 452, input component 453, bulk storage component 454, network communication port 459 and display module 455.

The components of computer system 400 cooperatively function to provide a variety of functions, including directing rack equipment operational setting modulation in accordance with a power purchase plan of the present invention. Communication bus 457 communicates information within computer system 400. Processor 451 processes information and instructions, including instructions and information for modulating rack equipment operation and performance (e.g., processor 451 processes power plan incident tracking module 221 instructions, power plan inspection module 222 instructions, telemetry collection module 223 instructions, direction formation module 224 instructions, etc.). Memory 452 stores information and instructions, including instructions for implementing a rack equipment power purchase plan. Bulk storage component 454 also provides storage of information (e.g., rack equipment description information, policy information, etc.). One embodiment of a present interface can be implemented by input component 453, display module 455 and network communications port 459. Input component 453 facilitates communication of information (e.g., operator policy initiated changes, operator entered rack equipment description information, operator intervention in rack equipment operation changes, etc.) to computer system 400. Display module 455 displays information to a user (e.g., a graphical user interface conveying rack equipment operation settings and performance levels, rack equipment description information, power purchase plan policy information, correlation between the information, etc.). Network communication port 459 provides a communication port for communicatively coupling with a network (e.g., for communicating power purchase plan related information with a client, a utility, a remote operator and/or control center, etc.).

Thus, a present invention rack equipment power purchase plan system and method facilitates convenient and efficient modulation of rack equipment based upon a power purchase plan. The rack equipment power purchase plan permits automated implementation of rack equipment power supply policies and associated power fluctuation management objectives. For example, the present inventions can assist centralized computer facilities to cope with power supply fluctuations (e.g., rolling blackouts, supply interruptions, etc.) in a constructive manner (e.g., coordinated equipment shut down) while providing the opportunity of maintaining mission critical or high priority activities. Automatic direction of equipment operation setting and performance level adjustments is provided to meet the rack equipment power purchase plan objectives (e.g. power consumption and heat dissipation levels). Equipment description information, policy information and rack equipment operation modification commands are automatically communicated via communication links implementing a rack equipment management protocol. The communication links are flexibly adaptive to a variety of implementations and can be implemented on an available communication medium (e.g., power cord lines). The present invention also provides a convenient and efficient interface that can correlate diverse rack equipment management information in a unified manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the Claims appended hereto and their equivalents.

What is claimed is:

1. A rack equipment power purchase plan supervision system comprising:
    rack equipment related to information processing operations;
    a power purchase plan supervision component for supervising said rack equipment operations in accordance with a power purchase plan, wherein said power purchase plan defines operational settings of the rack equipment for various power supply conditions; and
    a communication bus for communicatively coupling said rack equipment and said power purchase plan supervision component, wherein said communication bus communicates information between said power purchase plan supervision component and said rack equipment.

2. A rack equipment power purchase plan supervision system of claim 1 wherein said power purchase plan supervision component directs changes in the frequency and voltage operating characteristics of said rack equipment.

3. A rack equipment power purchase plan supervision system of claim 1 wherein said power purchase plan supervision component spawns power purchase plan trigger events.

4. A rack equipment power purchase plan supervision system of claim 1 wherein said power purchase plan includes rack equipment operation settings agreed upon between a client and a host.

5. A rack equipment power purchase plan supervision system of claim 1 wherein said power purchase plan permits predetermined rack equipment operations to continue processing regardless of a fluctuation in a power supply.

6. A rack equipment power purchase plan supervision system of claim 1 wherein a power purchase plan policy is dynamically adjustable on the fly.

7. A rack equipment power purchase plan supervision system of claim 1 wherein said power purchase plan supervision component optimally balances consumption of available power and performance of processing activities.

8. A power purchase supervision method comprising:
    detecting an occurrence of an event already covered by a power purchase plan;
    issuing a command to modulate power consumption of rack equipment based upon said power purchase plan; and
    checking implementation of said power consumption modulation.

9. A power purchase plan supervision method of claim 8 wherein said modulation is executed by adjusting a frequency and a voltage of said rack equipment.

10. A power purchase plan supervision method of claim 8 wherein said modulation is executed by turning off said rack equipment.

11. A power purchase plan supervision method of claim 8 further comprising providing a correlation between said modulation and said power purchase plan.

12. A power purchase plan supervision method of claim 8 wherein said power purchase plan is an agreement between a client and a host.

13. A power purchase plan supervision method of claim 8 further comprising automatically adjusting said power purchase plan interactively.

14. A computer usable storage medium having computer readable program code embodied therein for causing a computer system to implement power purchase plan instructions comprising:
    a power plan incident tracking module for tracking power fluctuation incidents designated in a power purchase plan;
    a power plan inspection module for determining power purchase plan policy directions associated with said power fluctuation incidents; and
    a direction formation module for formulating performance modification commands for implementing said power purchase plan directions.

15. A computer usable storage medium of claim 14 further comprising a telemetry collection module for collecting characteristics and activity information of equipment associated with said power purchase plan.

16. A computer usable storage medium of claim 15 wherein said telemetry collection module also confirms performance adjustment commands are complied with.

17. A computer usable storage medium of claim 14 further comprising an event spawning module for spawning power purchase plan events.

18. A computer usable storage medium of clam 14 wherein said performance modification commands modify the performance of rack equipment and related support equipment.

19. A computer usable storage medium of claim 14 wherein said direction formation module generates a command to postpone processing.

20. A computer usable storage medium of claim 14 wherein said policies are structured in accordance with the business requirements of a client.

* * * * *

UNITED STATES PATENT AND TRADEMARK OFFICE
CERTIFICATE OF CORRECTION

PATENT NO. : 7,424,624 B2 Page 1 of 1
APPLICATION NO. : 10/741906
DATED : September 9, 2008
INVENTOR(S) : Ricardo Espinoza-Ibarra et al.

It is certified that error appears in the above-identified patent and that said Letters Patent is hereby corrected as shown below:

In column 3, line 35, delete "10/100/100bT" and insert -- 10/100/1000bT --, therefor.

Signed and Sealed this

Thirtieth Day of December, 2008

JON W. DUDAS
*Director of the United States Patent and Trademark Office*